Dec. 22, 1953         F. H. KEAST         2,663,493
BLADING FOR COMPRESSORS, TURBINES, AND THE LIKE
Filed April 26, 1949                 7 Sheets-Sheet 1

INVENTOR
FRANCIS H. KEAST.
By
ATTORNEY

INVENTOR
FRANCIS H. KEAST
By
ATTORNEY

Dec. 22, 1953 F. H. KEAST 2,663,493
BLADING FOR COMPRESSORS, TURBINES, AND THE LIKE
Filed April 26, 1949 7 Sheets-Sheet 3

INVENTOR
FRANCIS. H. KEAST.
By
ATTORNEY.

Dec. 22, 1953   F. H. KEAST   2,663,493
BLADING FOR COMPRESSORS, TURBINES, AND THE LIKE
Filed April 26, 1949   7 Sheets-Sheet 4

INVENTOR
FRANCIS H. KEAST
By
ATTORNEY

Dec. 22, 1953   F. H. KEAST   2,663,493
BLADING FOR COMPRESSORS, TURBINES, AND THE LIKE
Filed April 26, 1949   7 Sheets-Sheet 5

INVENTOR.
FRANCIS H. KEAST.
By
ATTORNEY.

Dec. 22, 1953 F. H. KEAST 2,663,493
BLADING FOR COMPRESSORS, TURBINES, AND THE LIKE
Filed April 26, 1949 7 Sheets-Sheet 7

INVENTOR
F. H. KEAST
PER

ATTORNEY.

Patented Dec. 22, 1953

2,663,493

UNITED STATES PATENT OFFICE 2,663,493

BLADING FOR COMPRESSORS, TURBINES, AND THE LIKE

Francis H. Keast, Toronto, Ontario, Canada, assignor to A. V. Roe Canada Limited, Malton, Ontario, Canada, a corporation Application April 26, 1949, Serial No. 89,736

6 Claims. (Cl. 230—122)

1

This invention relates to blading for compressors, turbines and the like operating with a compressible fluid, and more particularly to blading for compressors or turbines which are intended to operate under such conditions that the velocities of the fluid flow relative to the stationary or moving blades are so high that the compressibility of the fluid may affect adversely the operation of the compressor or turbine.

As the relative velocity of a fluid past a solid body, such as a blade, increases, the relative velocity will reach a value at which the effect of the body on the fluid flow is such as to cause part of the fluid to move with a velocity equal to or close to the local speed of sound in the fluid. At or near this condition adverse effects occur which increase the drag forces acting on the body and result in disturbed flow conditions. In the case of a compressor or turbine operating with a compressible fluid the effect is to decrease the efficiency of compression or expansion. Therefore in the design of such compressors or turbines care is taken to avoid large adverse effects due to the factors explained above. The usual method of doing this is to limit the velocities of the fluid flow relative to the blades of the machine. It is clear, however, that if higher relative velocities could be used without the adverse effects mentioned above considerable advantage would result. The main object of this invention is consequently to provide a blade construction which will operate efficiently at relative velocities which equal an appreciable fraction of the local speed of sound in the fluid.

A further important object of this invention is to provide a form of blade designed to permit the construction of efficient rotary fluid compressors or turbines which are more compact and lighter than existing machines without sacrificing performance characteristics.

It is well known that an aircraft wing which is swept either backwards or forwards relative to the approaching air stream has the effect of delaying the onset of the adverse compressibility effects as the aircraft speed relative to the air increases; that is, the effects are not noticeable until higher speeds are reached than those at which the effects would occur with an aircraft with unswept wings. In aircraft however, where the wings sweep backwards or forward from the apex of a V, early compressibility effects occur either at the apex of the V in the case where the wings are swept back, or at the wing tips where the wings are swept forward. In accordance with this invention, the blading is so designed that

2 the apex of the V is located in a region of low local relative velocity, so that no early compressibility troubles arise at that point.

In the case of rotor blading for an axial flow type compressor the proper placing of the apex of the V may be achieved by using as a basis the type of blading similar to that known as "free vortex" blading. Here the velocity of the air relative to the rotor blade is highest at the tip of the blades, i. e. at the outer diameter, while for the stator blade the highest relative velocity is also at the tip, which in this case is at the inner diameter. At any other section the relative velocities are lower than these maxima so that the apex of the V can be at an intermediate section chosen in a manner subsequently described. This location of the apex may be so chosen that the early effects of compressibility are avoided at the apex whilst the sweep back at the tip ensure that they will be avoided there also. In practice there will be some freedom in the choice of the intermediate section at which the apex occurs and it may be chosen so that the bending stresses in the rotor blade caused by the offsetting of the sections relative to the root are a minimum. Another object of the invention is therefore to provide a blade construction in which centrifugal stresses are minimized while the most efficient form for avoiding compressibility effects is obtained.

All of the foregoing and still further objects and advantages of the invention will become apparent from a study of the following specification, taken in conjunction with the accompanying drawings, wherein like characters of reference indicate corresponding parts throughout the several views and wherein:

Fig. 1 is a combined construction diagram and projection, and it includes (right hand portion) the construction lines for the first step in designing a simplified form of swept compressor rotor blade according to the invention, and it also includes (left hand portion) the resulting projection of successive camber lines and leading and trailing edges of the said blade on the plane of the root section of the blade, that is on a plane tangential to the rotor.

Fig. 2 includes (left hand portion) a reproduction of the projection in Fig. 1, and it also includes (right hand portion) a projection of the leading and trailing edges of the said blade, after the first design step, on a radial plane containing the axis of the compressor.

Fig. 3 is a radial end view of the simplified form of swept blade after the first design step.

Fig. 4 is a combined construction diagram and projection, and it includes (lower right hand portion) the construction lines for the second step in designing a simplified form of swept compressor rotor blade according to the invention; it includes (left hand portion) the resulting projection of successive camber lines and leading and trailing edges of the said blade on the plane of the root section of the blade, that is on a plane tangential to the rotor, and it also includes (upper right hand portion) a projection of the leading and trailing edges of the said blade, after the second design step, on a radial plane containing the axis of the compressor.

Figure 8:
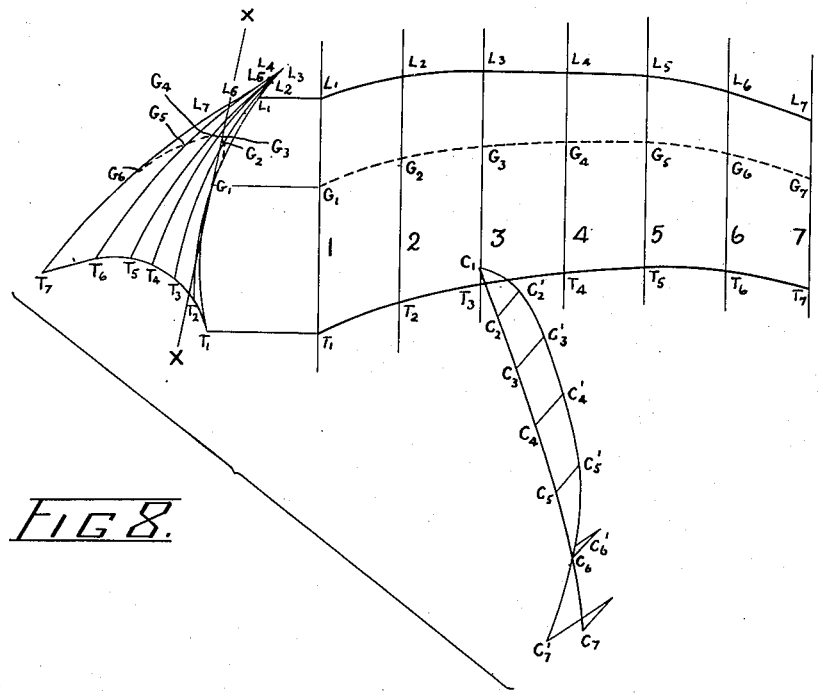

Fig. 8 is a combined construction diagram and projection, and it includes (lower right hand portion) the construction lines for the first step in designing a corrected form of swept compressor rotor blade according to the invention; it includes (left hand portion) the resulting projection of successive camber lines and leading and trailing edges of the said blade on the plane of the root section of the blade, that is on a plane tangential to the rotor, and it also includes (upper right hand portion) a projection of the leading and trailing edges of the said blade, after the first design step, on a radial plane containing the axis of the compressor.

Figure 9:
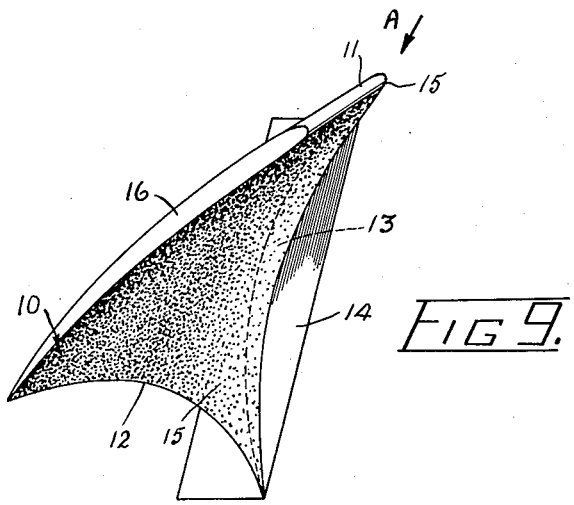

Fig. 9 is a radial end view of the corrected form of swept blade after the first design step.

Figure 10:
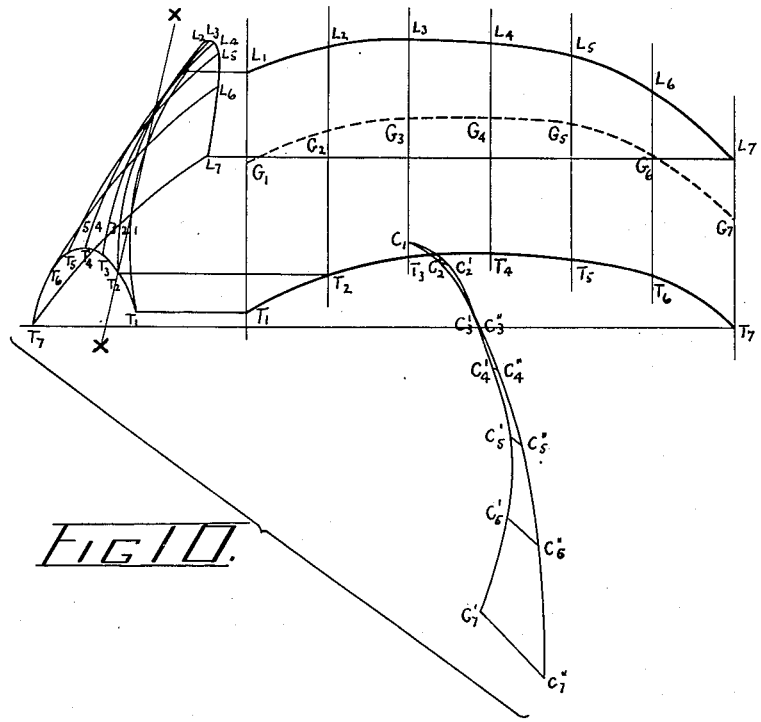

Fig. 10 is a combined construction diagram and projection, and it includes (lower right hand portion) the construction lines for the second step in designing a corrected form of swept compressor rotor blade according to the invention; it includes (left hand portion) the resulting projection of successive camber lines and leading and trailing edges of the said blade on the plane of the root section of the blade, that is on a plane tangential to the rotor, and it also includes (upper right hand portion) a projection of the leading and trailing edges of the said blade, after the second design step, on a radial plane containing the axis of the compressor.

Figure 11:
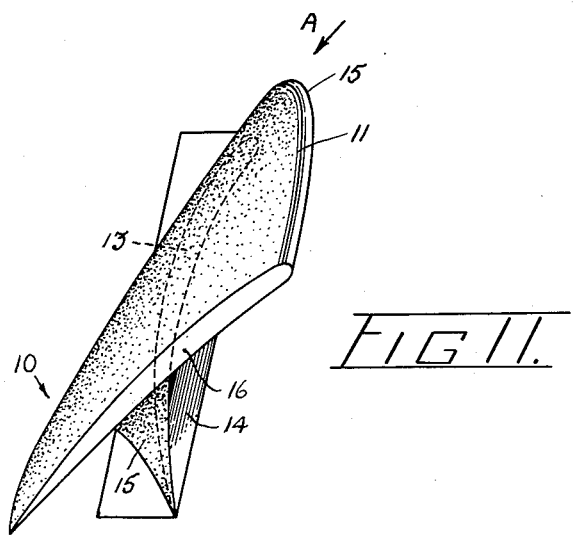

Fig. 11 is a radial end view of the final corrected form of swept blade after the second design step.

Figure 12:
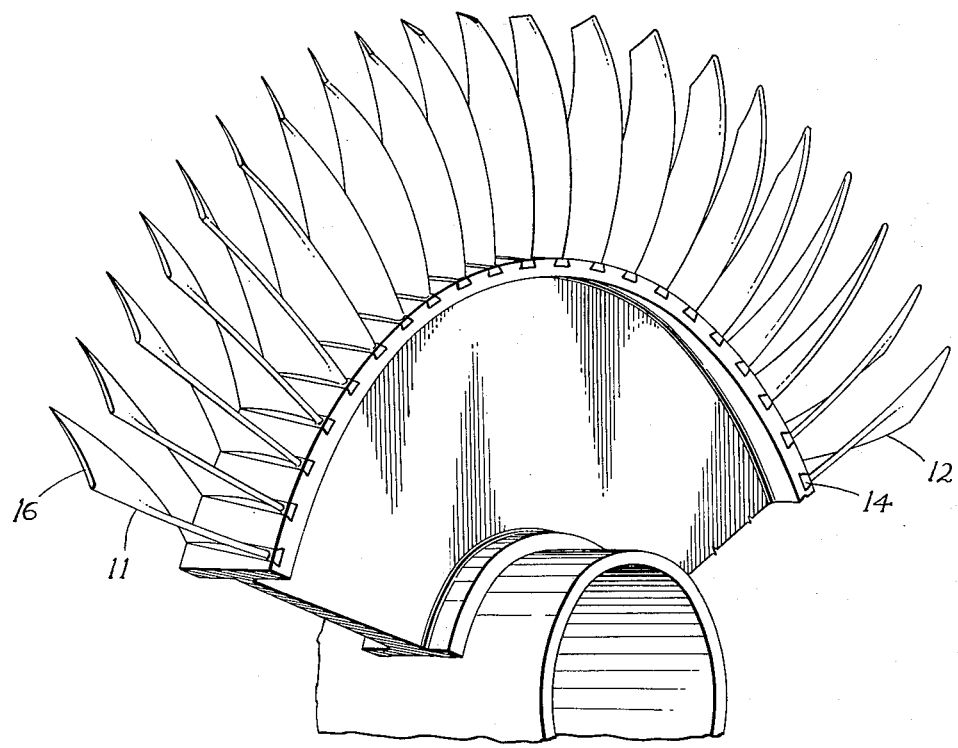

Fig. 12 is a fragmentary view of a typical rotor disc carrying swept rotor blades according to the invention, showing the orientation of blades relative to the axis of rotation of the rotor.

Figure 13:
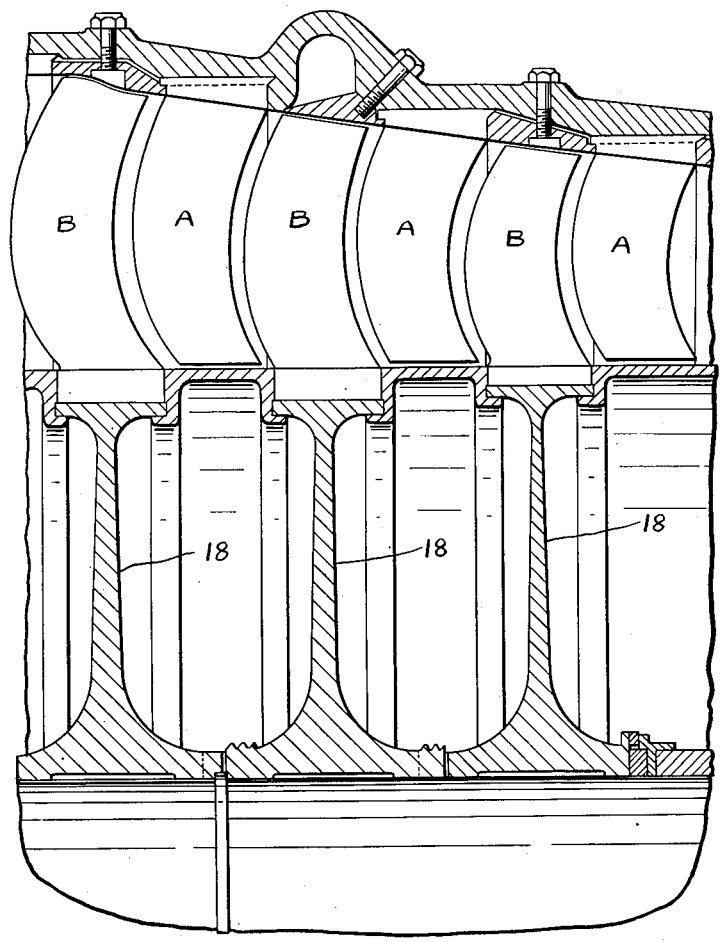

Fig. 13 is a fragmentary sectional view, taken on a radial plane containing the axis of the compressor, of several stages of the compressor and showing rotor and stator blades according to the invention installed in the conventional arrangement of alternating rotor and stator blades.

A rotor blade for an axial flow compressor has been chosen for the purpose of illustration but the same type of blade is adapted for use in a compressor stator and also in the rotors and stators of turbines. Furthermore, to clarify the explanation throughout, circular arcs have been chosen to indicate camber lines of a rotor blade, although this may be departed from in an actual blade design without affecting the principles involved in the invention. The first step in designing a simplified form of blade according to the invention is diagrammatically shown in Figs. 1 and 2. Viewed radially to the compressor rotor, seven points designated as $C_1$, $C_2$, $C_3$, $C_4$, $C_5$, $C_6$ and $C_7$ are the centres of circles whose circular arcs of equal length, corresponding to the illustrated arcs $L_1T_1$, $L_2T_2$, $L_3T_3$, $L_4T_4$, $L_5T_5$, $L_6T_6$, and $L_7T_7$, would define seven camber lines (not shown) located at equally spaced arbitrarily-chosen successive sections, numbered 1, 2, 3, 4, 5, 6 and 7 beginning with the root section, of the usual type of prior art blade. Such a prior art blade would have a straight leading edge which would correspond in radial end view to the position of $L_1$ in Fig. 1, and the radii of the successive arcs would be progressively greater so that all the circular arcs would pass through the point $L_1$, that is $L_1$, $L_2$, $L_3$, $L_4$, $L_5$, $L_6$ and $L_7$ would be superimposer. According to the invention the above-described prior art blade is given a sweep in a direction which depends upon the direction of the air flow at successive points along the leading edge of the blade.

The desired sweep is derived by effecting progressively increasing displacements of the centres of the arcs representing camber lines of the usual prior art blade; $C_2$ being displaced to a new position $C_2'$ such that the direction of the line $C_2C_2'$ is opposite to the sense of the air flow at the point midway between sections 1 and 2, and $C_3$ being displaced to a point $C_3'$ located by effecting a displacement of $C_3$ identical with the displacement given to $C_2$ and effecting a further displacement in the sense opposite to the sense of the air flow at the point midway between sections 2 and 3. The method of deriving the respective magnitudes of the said displacements will be described subsequently, but for purposes of illustrating the simplified form of blade the magnitude of each displacement is here arbitrarily taken so as to produce a blade having angular leading and trailing edges.

From section 3, corresponding to the centre $C_3$, to the tip of the blade, subsequent sections are swept in the opposite sense, namely, in a direction identical to the sense of the air flow at successive points along the leading edge of the blade, by, first, displacing the centres $C_4$, $C_5$, $C_6$ and $C_7$ by the same amount and in the same sense as the displacement of $C_3$ to $C_3'$, and second, displacing them from the positions thus found to new positions $C_4'$, $C_5'$, $C_6'$ and $C_7'$, the second displacements having progressively greater magnitudes in a sense identical to the direction of the air flow at the point midway between the section under consideration and the previous section.

From $C_1$ and from the new centres $C_2'$, $C_3'$, $C_4'$, $C_5'$, $C_6'$ and $C_7'$, the camber lines numbered 1, 2, 3, 4, 5, 6 and 7 according to the number of the section at which each is located are drawn as a series of circular arcs each of which will terminate at the leading and trailing edges of the blade. The radii of the successive arcs is the same as the radii of the corresponding arcs in the above-mentioned prior art blade, that is, $C_1L_1$, $C_2L_1$, $C_3L_1$, $C_4L_1$, $C_5L_1$, $C_6L_1$ and $C_7L_1$ respectively, since in the prior art blade $L_1$, $L_2$, $L_3$, $L_4$, $L_5$, $L_6$ and $L_7$ are superimposed. The points $L_2$, $L_3$, $L_4$, $L_5$, $L_6$ and $L_7$ on the leading edge, corresponding to the sections 2, 3, 4, 5, 6 and 7 respectively, are located by making $L_1L_2$, $L_1L_3$, $L_1L_4$, $L_1L_5$, $L_1L_6$ and $L_1L_7$ respectively equal to $C_2C_2'$, $C_3C_3'$, $C_4C_4'$, $C_5C_5'$, $C_6C_6'$ and $C_7C_7'$. The corresponding points on the trailing edge $T_2$, $T_3$, $T_4$, $T_5$, $T_6$ and $T_7$ are preferably located by applying the known common chord length to all the arcs, although varying chord lengths may be applied to individual arcs to obtain a trailing edge outline differing from the leading edge outline if such is desired. The outline of the leading edge of the blade is then obtained by joining the points $L_1$, $L_2$, $L_3$, $L_4$, $L_5$, $L_6$ and $L_7$ and the outline of the trailing edge by joining points $T_1$, $T_2$, $T_3$, $T_4$, $T_5$, $T_6$ and $T_7$.

Figure 2:
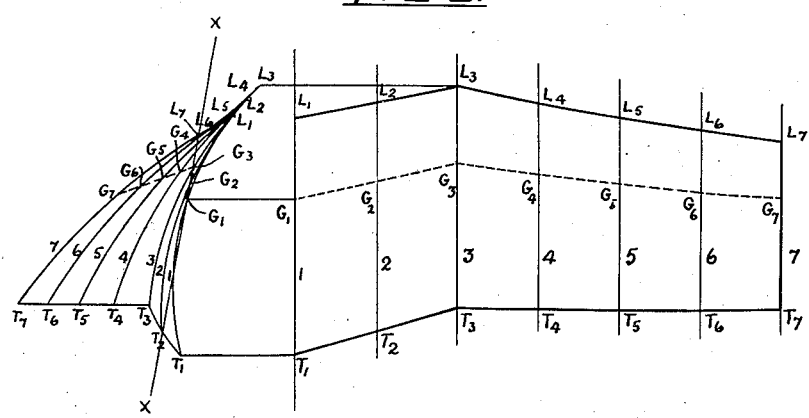

Points $G_1$, $G_2$, $G_3$, $G_4$, $G_5$, $G_6$ and $G_7$, which lie on the dotted line in Fig. 2, represent the positions of the mass centres or centroids of the sections 1, 2, 3, 4, 5, 6 and 7 in a finished blade as plotted by empirical methods well known in the art. The line $xx$, passing through $G_1$ and substantially parallel to the chord of the root section, which will be referred to hereinafter, is the principal axis, at the root section, of the transverse bending of the blade which will be subsequently described.

Figure 1:
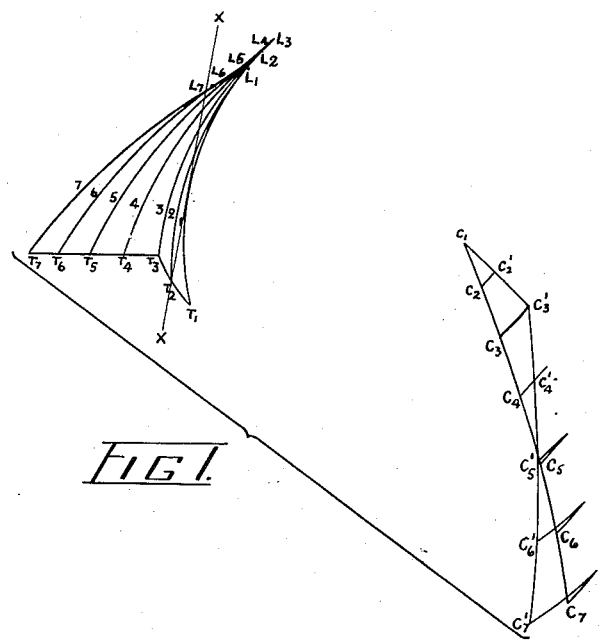

The plane projection in radial end view shown in Fig. 1 is reproduced in the left-hand portion of Fig. 2, while the right-hand portion of Fig. 2 is a plane projection in plan (tangential) view of the same blade, having a leading edge $L_1L_7$ and a trailing edge $T_1T_7$. The locations of the tangential planes through the camber lines at the sections, which are again numbered 1–7, are indicated. Certain of the corresponding points on the end view projection and on the plan view projection are joined by construction lines to show the derivation of the plan form of the blade. The positions of the centroids $G_1$, $G_2$, $G_3$, $G_4$, $G_5$, $G_6$ and $G_7$ are indicated on the plan view by projections from the locations of the said centroids on the end view.

Figures 3, 5:
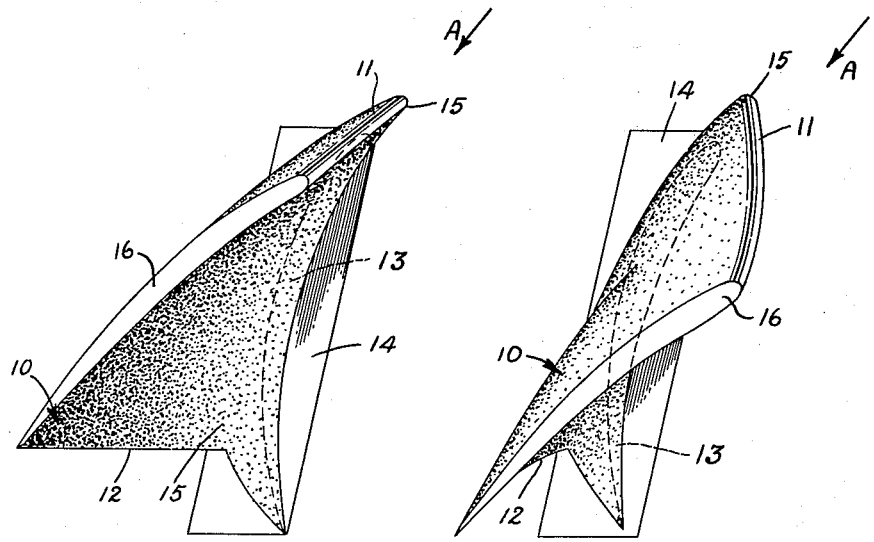
Fig. 5 is a radial end view of the simplified form of swept blade after the second design step.

A radial end view of an actual rotor blade constructed according to the designing step indicated in Figs. 1 and 2 is shown in Fig. 3. The rotor blade, generally indicated by reference numeral 10, has a leading edge 11 and a trailing edge 12, and a root section 13 where the blade 10 is fixed to the rotor 14. The blade 10 is swept forward by a progressively greater negative displacement, relative to the direction indicated by arrow A of the local fluid flow, of each successive section from the root section 13 to apex 15, which is the point of maximum negative displacement, and from the apex 15 the blade is swept back by a progressively greater positive displacement of each successive section to the tip 16.

Figure 4:
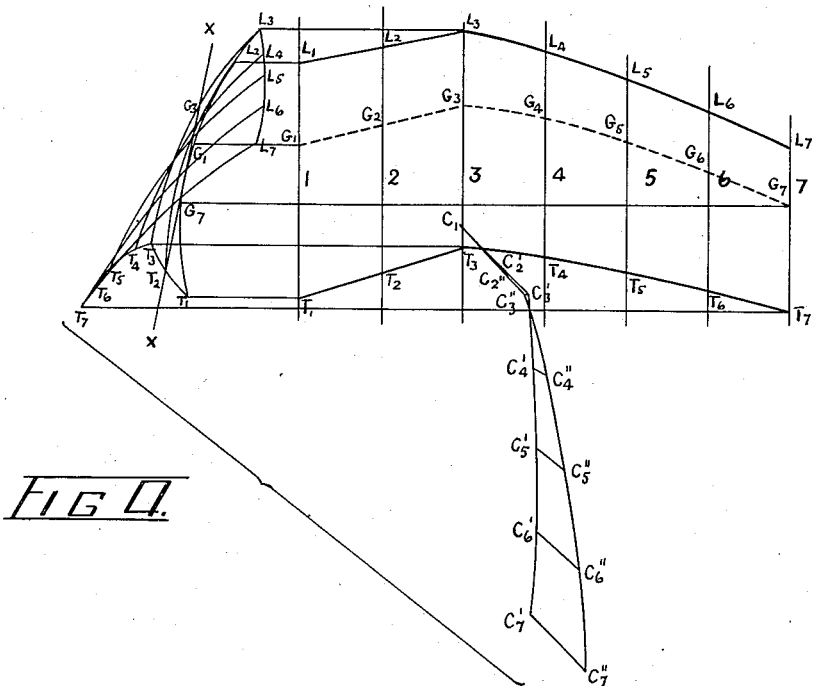

As a result of the offset given to the sections by the displacements indicated in Fig. 1, a blade having those displacements alone would be subject to exaggerated bending moments due to forces acting on the offset sections. To minimise such bending moments, the blade shown in Figure 3 is given a progressive displacement from root to tip by imposing additional displacements $C_2'C_2''$, $C_3'C_3'''$, $C_4'C_4''$, $C_5'C_5'''$, $C_6'C_6''$ and $C_7'C_7''$ on the centres of the camber lines 2, 3, 4, 5, 6 and 7 in a direction substantially perpendicular to the chord line of the respective individual sections, as indicated in Fig. 4. These displacements are chosen so that the centroids $G_2$, $G_3$, $G_4$, $G_5$, $G_6$ and $G_7$ now lie close to, or on, the radial plane containing the principal axis of transverse bending $xx$.

In Fig. 5 is shown an actual rotor blade which has been developed by giving to the blade shown in Fig. 3 the additional displacement diagrammatically illustrated in Fig. 4. The blade shown in Fig. 5 consequently retains the sweep which appears in Fig. 3, but has progressive displacements of the sections in a direction substantially perpendicular to their chord lines so as to minimize stresses caused by forces acting on the swept blade.

Figure 6:
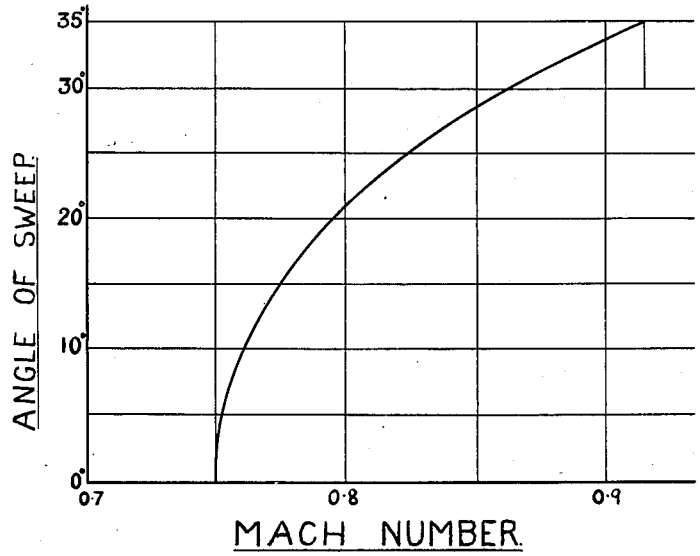
Fig. 6 is a graph showing the effect of the angle of sweep on the value of the critical Mach number for a typical compressor section.

In order to determine the most efficient respective magnitudes for each of the displacements of the centres of the camber line arcs in the sense of local fluid flow (see Figs. 1 and 2), it is necessary to determine the minimum angle of sweep required to maintain normal or subsonic fluid flow at each of the sections of the blade. This may be done by plotting graphs such as shown in Figs. 6 and 7 and using the resulting curves to determine the most advantageous angle of sweep at each section; the angle of sweep at any section is the angle the tangent of which is the rate of change at that section of the magnitudes of successive linear displacements in the design sense of flow outwardly from the root with respect to the radial distance of the respective sections from the root.

When prior art blades of the straight-edged type are used in a compressor or turbine, shock waves due to compressibility begin to form locally at an overall Mach number of approximately .75. The graph shown in Fig. 6 shows the relationship for such blades between the angle of sweep and the critical Mach number; the critical Mach number is the value of the overall Mach number at which adverse compressibility effects begin to occur at each section of the blade.

Figure 7:
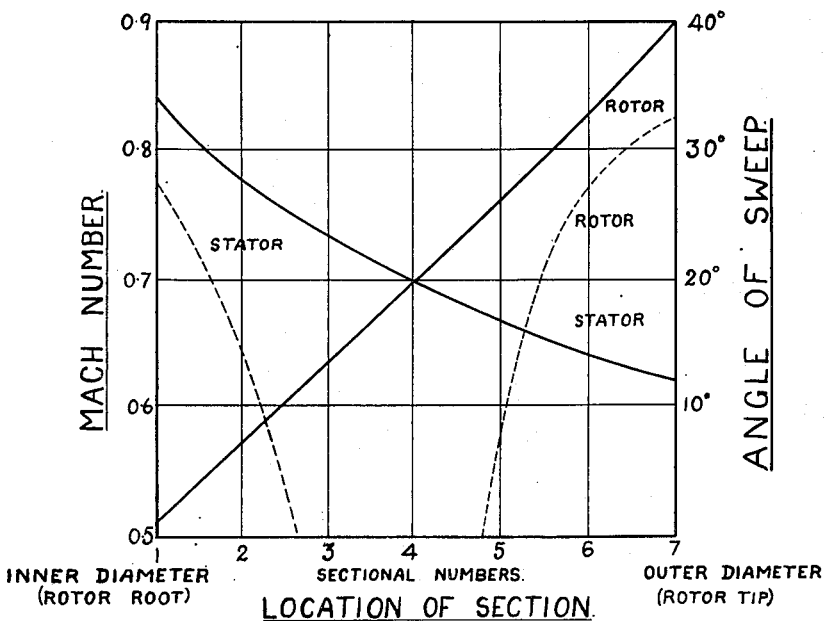
Fig. 7 is a graph showing in full lines the variation of the design Mach number along a typical compressor rotor blade and stator blade, and, in dotted lines, the angle of sweep required at any section to make the design Mach number correspond to the critical Mach number as determined by the graph shown in Fig. 6.

In the graph shown in Figure 7 the overall Mach number which is inherent in the design of the machine is plotted in solid lines for each section of the blade, one line applying to the rotor and the other to the stator as indicated. To determine the minimum angle of sweep at each section of a blade, the designer reads from Fig. 7 the overall Mach number applicable to the particular section of the blade, and using the Mach number which he has obtained from Fig. 7 he reads from Fig. 6 the angle of sweep which is necessary in order that the given Mach number shall not exceed the critical value, at that angle of sweep. The angle of sweep determined in this manner is then plotted against the sections in Fig. 7 as shown in dotted lines.

It will be seen that the rotor blade requires sweep at the outer sections, namely from beyond what is herein denoted as section 4 to the tip of the blade, while the stator blade requires sweep at the inner sections, the sweep being required in each case at the tip of the blade; in both types of blade the relationship between the amount of sweep required at each section and the location of the section is not a straight line relationship. In Figs. 1 and 2, however, to achieve simplicity the amount of sweep at each section, or in other words, the magnitude of the displacement of the centre of each of the camber line arcs, was arbitrarily taken so as to produce a blade having straight line outlines. In Fig. 8 is diagrammatically shown the rotor blade designing step which follows the method shown in Figs. 1 and 2 but in which the respective magnitudes of the displacements $C_2C_2'$, $C_3C_3'$, $C_4C_4'$, $C_5C_5'$, $C_6C_6'$, and $C_7C_7'$, which are given to the centres of the corresponding camber lines 2, 3, 4, 5, 6 and 7 in the direction of the local fluid flow, are determined. From the data for each section obtained from the graphs shown in Figs. 6 and 7, the relative displacements of the centres $C_5$, $C_6$ and $C_7$, are calculated by multiplying the tangent of the required angle of sweep at each section by the distance between the sections. The relative displacements of the centres $C_2$, $C_3$ and $C_4$ are similarly calculated but from the data obtained from the graph applicable to a stator blade A (see Fig. 13), since the angle of sweep at the root of a rotor blade B is not required to overcome adverse compressibility effects but is incorporated in order that the stator blades adjacent thereto and requiring sweep at the tip may be accommodated in as short an axial length as possible in the assembly of the compressor or turbine; in addition the sweep at the root of the rotor blade is beneficial in correcting the location of the centre of gravity of the blade in view of the sweep at the tip thereof. Accordingly for either a stator or a rotor blade the magnitudes of the displacement $C_2C_2'$ and the dependent displacements $C_3C_3'$, $C_4C_4'$, $C_5C_5'$, $C_6C_6'$ and $C_7C_7'$ may be readily determined by applying the graphs appropriate to the blade, to determine the sweep at the tip, and the graphs appropriate to the adjacent interacting blade, to determine the sweep at the root.

In a manner analogous to the design step shown in Fig. 4, the corrected blade shown in radial end view in Fig. 9 and constructed according to the design steps indicated in Fig. 8 is finally given a progressive displacement from root to tip by imposing additional displacements $C_2'C_2''$, $C_3'C_3''$, $C_4'C_4''$, $C_5'C_5''$, $C_6'C_6''$, and $C_7'C_7''$, on the centres of the camber lines 2, 3, 4, 5, 6, 7 in a direction substantially perpendicular to the chord lines of the individual sections, as indicated in Fig. 10. It will be realized that the additional displacements will cause a slight change in the effective angle of sweep. This may be allowed for in applying the additional sweep in the first step of the design by the use, for example, of a small empirical correction factor. The final form of such a blade is shown is radial end view in Fig. 11. It will be seen that in this final form, the blade is swept at the tip in such a way as to minimize the effects due to the compressibility of the fluid at high speeds; the angle of sweep at any section has been determined according to the magnitude of the relative velocity of the fluid flow at the section, and the direction of sweep is the same as the direction of the local fluid flow at that section of the blade; the blade is swept at the root so that the centre of gravity of the blade lies in the plane of rotation of the centroid of the root section, and finally the blade has a progressive displacement from root to tip as a result of an additional displacement of each section such that the centroids of all the sections of the blade are located approximately in the radial plane containing the axis of transverse bending, the stresses caused by forces acting on the swept blade being thereby minimized.

The blades according to the invention may be mounted by means of conventional roots 17 on a conventional rotor disc 18 as shown in Fig. 12.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. A blade for compressors, turbines and the like having successive alternating stator and rotor elements each carrying similar fixed blades, the said blade being characterized in that the leading edge at every successive foil section radially outward from a selected point on the leading edge between the root and the tip is displaced relatively to the leading edge at the preceding foil section in the same sense as the local fluid flow in the machine midway between the said sections, and the leading edge at every successive foil section outward from the root to the said selected point is displaced relatively to the leading edge at the preceding foil section in a sense generally opposite to that of the fluid flow in the machine whereby the leading edge configuration of the root portion will conform generally to the leading edge configuration of the tip portions of the preceding adjacent blades, the angle of sweep of the leading edge of the said blade at any section being not substantially less than the minimum required to maintain subsonic flow at that section.

2. A blade as claimed in claim 1 in which the trailing edges of successive foil sections outward from the root are displaced relatively to the trailing edges of the preceding foil sections in the same manner as the leading edges of the successive foil sections outward from the root.

3. A blade as claimed in claim 1 of the rotor type in which the extent of the said displacements in a sense opposite to that of the local fluid flow in the machine is such that the centre of gravity of the blade lies approximately in the plane of rotation of the centroid of the root section.

4. A blade for compressors, turbines and the like having successive alternating stator and rotor elements each carrying similar fixed blades, the said blade being characterized in that the leading edge at every successive foil section radially outward from a selected point on the leading edge between the root and the tip is displaced relatively to the leading edge at the preceding foil section in the same sense as the local fluid flow in the machine midway between the said sections, and the leading edge at every successive foil section outward from the root to the said selected point is displaced relatively to the leading edge at the preceding foil section in a sense generally opposite to that of the fluid flow in the machine whereby the leading edge configuration of the root portion will conform generally to the leading edge configuration of the tip portions of the preceding adjacent blades, the angle of sweep of the leading edge of the said blade at any section being not substantially less than the minimum required to maintain subsonic flow at that section, and further characterized in that successive foil sections outward from the root have relative displacements whereby the centre of gravity of the blade lies approximately in a radial plane containing an axis of transverse bending, the said axis of transverse bending being a hypothetical line through the centroid of the root section and substantially parallel to the chord of the root section.

5. A blade as claimed in claim 4 in which the trailing edges of successive foil sections radially outward from the root are displaced relatively to the trailing edges of the preceding foil sections in the same manner as the leading edges of the successive foil sections outward from the root.

6. A blade as claimed in claim 4 of the rotor type in which the extent of the said displacements in a sense opposite to that of the local fluid flow in the machine is such that the centre of gravity of the blade lies approximately in the plane of rotation of the centroid of the root section.

FRANCIS H. KEAST.

References Cited in the file of this patent

UNITED STATES PATENTS

| Number | Name | Date |
|---|---|---|
| 1,504,710 | Roberts | Aug. 12, 1924 |
| 1,613,816 | Biggs | Jan. 11, 1927 |
| 2,327,061 | Pollingher | Aug. 17, 1943 |
| 2,378,372 | Whittle | June 12, 1945 |
| 2,460,902 | Odor | Feb. 8, 1949 |

FOREIGN PATENTS

| Number | Country | Date |
|---|---|---|
| 830,990 | Germany | Feb. 11, 1952 |